(12) United States Patent
Staten et al.

(10) Patent No.: US 6,591,547 B1
(45) Date of Patent: Jul. 15, 2003

(54) DECORATIVE EDGING WITH BIDIRECTIONAL, INTERLOCKING JOINTS

(75) Inventors: Bobby L. Staten, Dallas, TX (US); Bret H. Scullion, South Lake, TX (US); Tommy Davis, Rowlett, TX (US)

(73) Assignee: Pave Stone Company, Dallas, TX (US)

(*) Notice: Subject to any disclaimer, the term of this patent is extended or adjusted under 35 U.S.C. 154(b) by 0 days.

(21) Appl. No.: 09/670,860

(22) Filed: Sep. 26, 2000

(51) Int. Cl.[7] .................................................. A01G 1/08
(52) U.S. Cl. ........................................................... 47/33
(58) Field of Search ............................... 47/33; 52/102; 404/6, 7; 256/27

(56) References Cited

U.S. PATENT DOCUMENTS

| | | | |
|---|---|---|---|
| 884,498 A | 4/1908 | King | |
| 2,313,363 A | 3/1943 | Schmitt | 61/39 |
| 2,624,193 A | 1/1953 | Larson | 72/41 |
| 2,794,375 A | * 6/1957 | Di Falco | 404/7 |
| 3,087,279 A | * 4/1963 | Thompson | |
| 5,017,049 A | 5/1991 | Sievert | 405/284 |
| 5,031,376 A | 7/1991 | Bender et al. | 52/609 |
| 5,062,610 A | 11/1991 | Woolford et al. | 249/52 |
| 5,119,587 A | * 6/1992 | Waltz | 47/33 |
| 5,168,678 A | * 12/1992 | Scott et al. | 47/33 |
| 5,249,950 A | 10/1993 | Woolford | 425/412 |
| 5,294,216 A | 3/1994 | Sievert | 405/286 |
| D352,789 S | 11/1994 | Adam | D25/113 |
| 5,426,888 A | * 6/1995 | Gnaedig | 47/33 |

(List continued on next page.)

FOREIGN PATENT DOCUMENTS

| DE | D. 2737322 A | * 2/1978 |
| JP | 2001-248263 | * 9/2001 |

OTHER PUBLICATIONS

Pavestone Co., Decorative Landscape Systems.
Pavestone Co., Beautiful Edgings You can Install Yourself.
Lowe's Home Improvement Warehouse, Jul. 1999.
K–Mart, Martha Stewart Everyday Garden, Mar.–Apr. 1999.
Keystone Retaining Wall Systems, Inc.,.

*Primary Examiner*—Peter M. Poon
*Assistant Examiner*—Jeffrey L. Gellner
(74) *Attorney, Agent, or Firm*—R. Darryl Burke; McKool Smith

(57) ABSTRACT

A precast, crushed stone landscape edging module comprises block body, a first, bidirectional interlocking joint, and a second, bidirectional interlocking joint. The block body has a first outer surface and a second outer surface and a first end surface extending from the first surface to the second surface and a second end extending from the first surface to the second surface. A first bidirectional, interlocking first joint is disposed on the first end surface and a second bidirectional, interlocking joint is disposed on the second end surface, wherein the first bidirectional, interlocking joint adapted to interlock with the second bidirectional, interlocking joint to prevent slippage and to enable rotation of the block body. The first bidirectional, interlocking joint has a first sawtooth and a first recess positioned adjacent to and joining the first sawtooth. The first recess is designed to receive a second sawtooth with a shape and dimension comparable to the first sawtooth. The second bidirectional, interlocking has the second sawtooth and a second recess positioned adjacent to and joining the second sawtooth. The second recess is designed to receive a sawtooth with a shape and dimension comparable to the first sawtooth. The first bidirectional, interlocking joint also has a first flat surface extending from said first outer surface to a first sawtooth and a second flat surface extending from a second outer surface to a first recess. The second bidirectional, interlocking joint also has a third surface extending from the outer surface to the second recess and a fourth surface extending from the second outer surface to the second sawtooth.

104 Claims, 8 Drawing Sheets

U.S. PATENT DOCUMENTS

| | | | | |
|---|---|---|---|---|
| D361,853 S | * | 8/1995 | Northrop | D25/164 |
| 5,577,343 A | * | 11/1996 | Flasch, Jr. | 47/33 |
| D409,312 S | * | 5/1999 | Staten et al. | D25/113 |
| D448,857 S | * | 10/2001 | Staten et al. | D25/113 |
| D448,859 S | * | 10/2001 | Doman | D25/113 |
| 6,413,009 B1 | * | 7/2002 | Duckett | 404/6 |

* cited by examiner

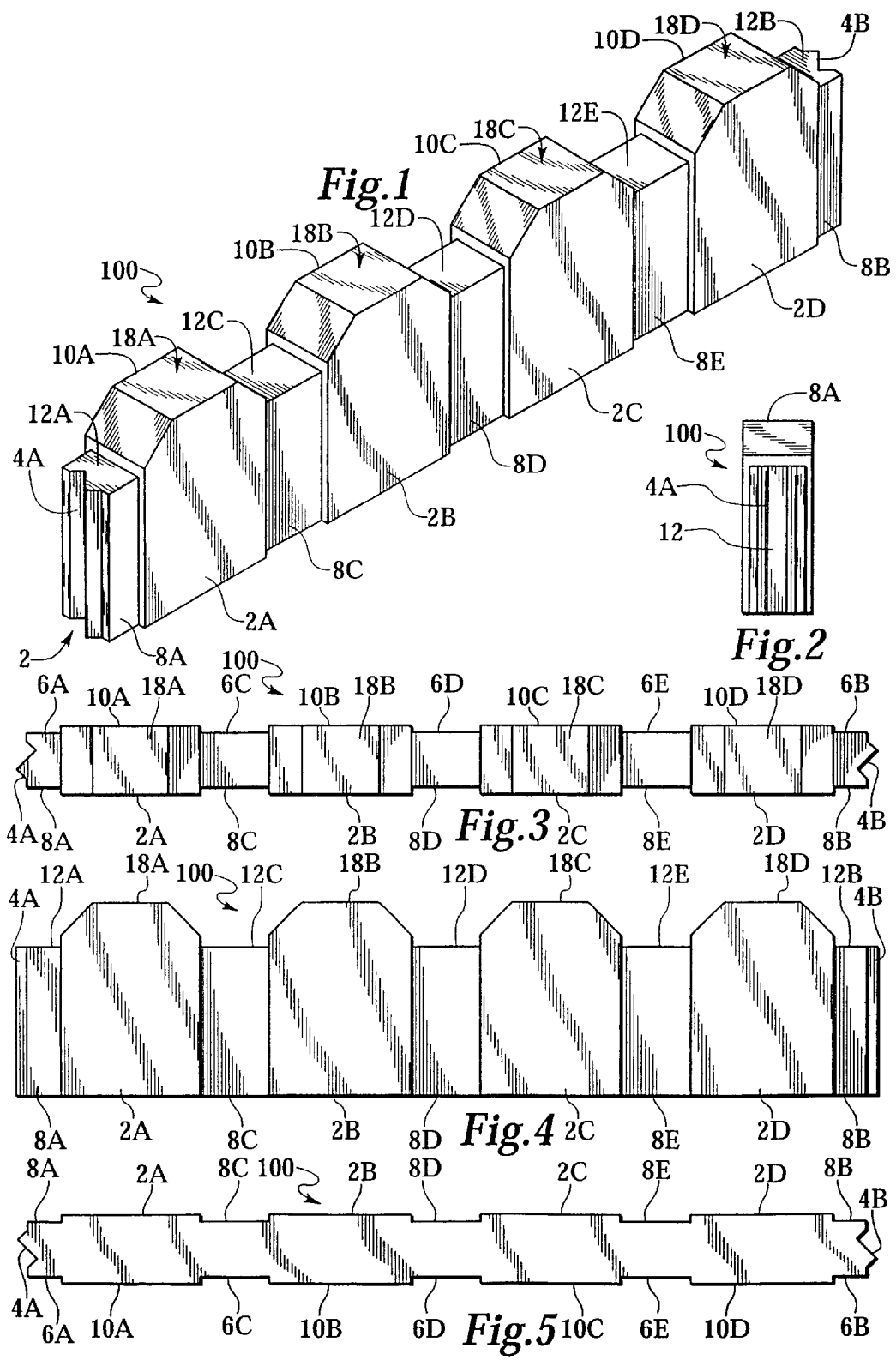

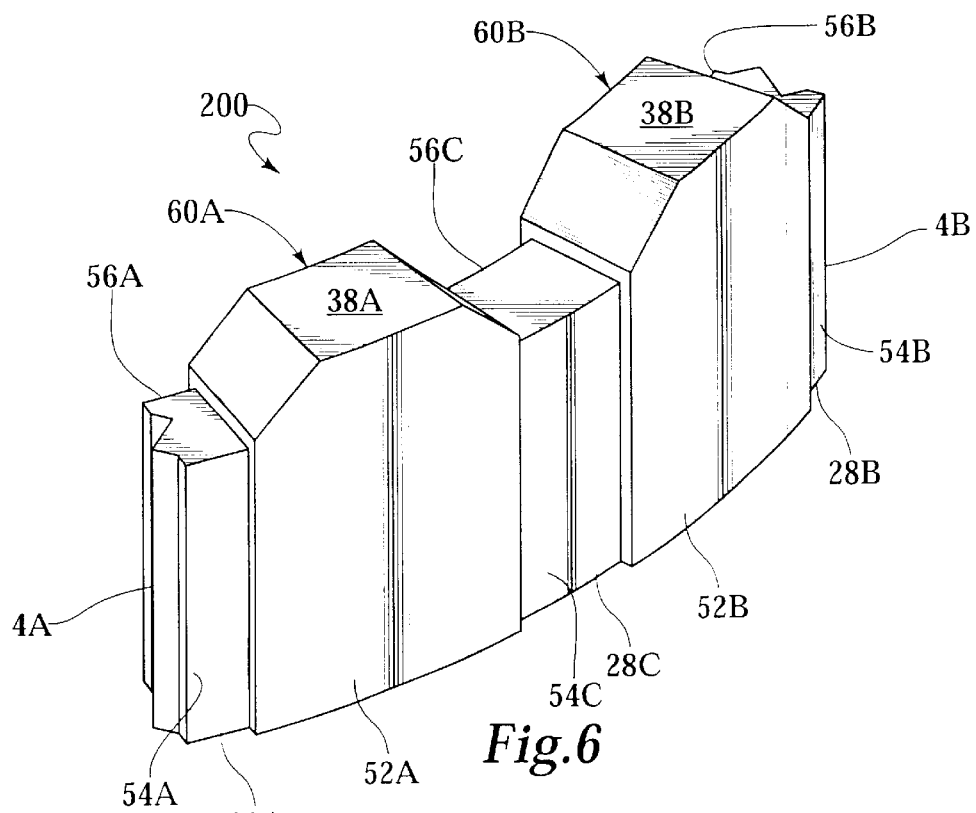
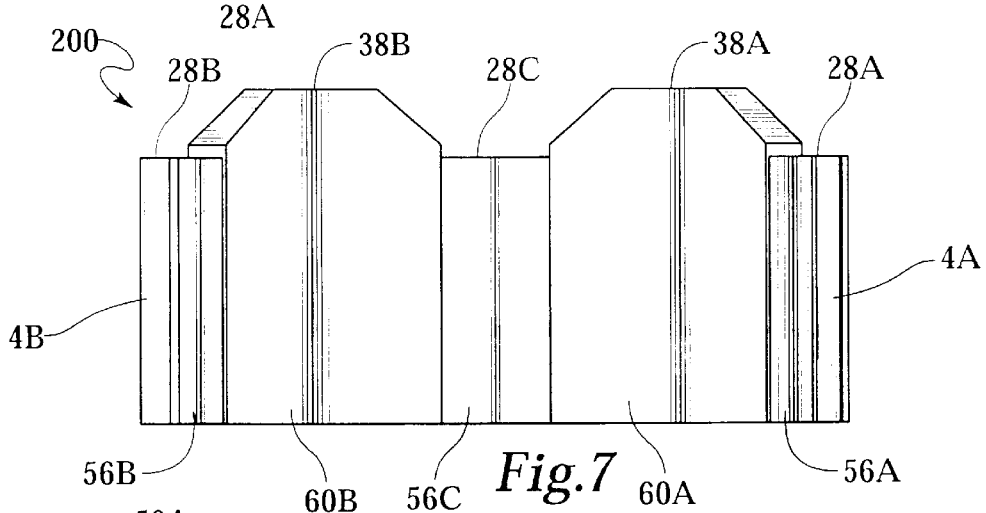
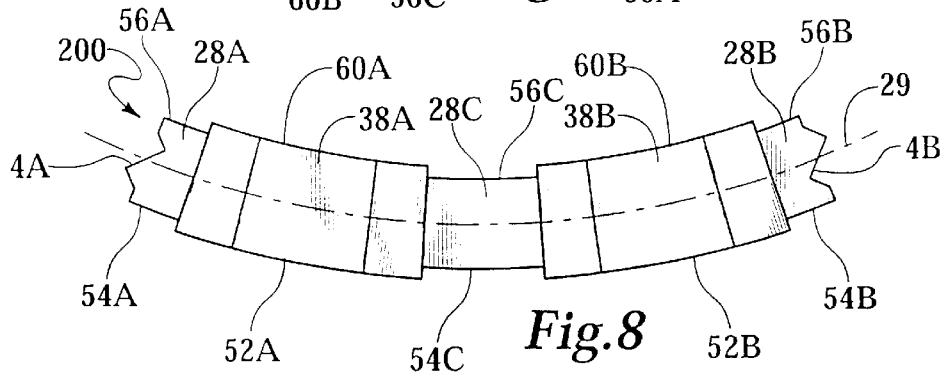

DECORATIVE EDGING WITH BIDIRECTIONAL, INTERLOCKING JOINTS

PARTIAL WAIVER OF COPYRIGHT PURSUANT TO 1077 O.G. 22(Mar. 20, 1987)

© Copyright. 2000. Pavestone Co. All of the material in this patent application is subject to copyright protection under the copyright laws of the United States and of other countries. As of the first effective filing date of the present application, this material is protected as unpublished material.

However, permission to copy this material is hereby granted to the extent that the owner of the copyright rights has no objection to the facsimile reproduction by any one of the patent document or patent disclosure, as it appears in the United States Patent and Trademark Office patent file or records, but otherwise reserves all copyright rights whatsoever.

FIELD OF INVENTION

The present invention generally relates to the decorative edging, particularly joints and design features used for dry cast, compacted concrete landscape edging and the multipurpose utilization of the unit in landscape design.

BACKGROUND

Garden and landscape design is a huge industry in the United States and throughout the world. A major challenge of garden and landscape design is the use and placement of edging and other materials used to edge gardens or planting areas. Over the past few centuries, rocks, bricks, metal edging (e.g., steel and aluminum), railroad ties, and lumber have been used to edge a garden or planting area and to prevent soil erosion. Generally, these traditional edging structures do not naturally interlock with one another and, therefore, are usually labor intensive and require high maintenance. For instance, if rocks or bricks are used, a mason and mortar are needed to fill in the gaps between the rocks or bricks and to secure the individual bricks or stones together. Similarly, if railroad ties or lumber are used, a craftsman is needed to cut, place, and nail individual pieces together. These traditional edging structures are also fairly limited in a design sense, in that they do not permit the easy creation of curved beds and are much less flexible, in that they often move when the underlying soil shifts. Finally, many of these traditional edging structures are not modular and do not otherwise interlock together. And, if the traditional edging units do join together, they are not equipped to lock specific modular units in definite or proper alignment and otherwise permit individual, modular units to be turned left or right to change direction of the resulting edge configuration.

There are other disadvantages of existing edging structures as well.

SUMMARY

A precast, concrete landscape edging module comprises a block body, a first, bidirectional interlocking joint; and a second, bidirectional, interlocking joint. The block body preferably has a first outer surface and a second outer surface and a first end surface extending from the first surface to the second surface and a second end extending from the first surface to the second surface. A first bidirectional, interlocking first joint is preferably disposed on the first end surface and a second bidirectional, interlocking joint is preferably disposed on the second end surface. The first bidirectional, interlocking joint is adapted to interlock with the second bidirectional, interlocking joint to prevent slippage and to enable rotation of the block body, if physically able to do so. In preferred applications, however, the first bidirectional, interlocking joint of one such module is actually adapted to interlock with a second bidirectional, interlocking joint of a second module, which is similar to the second bidirectional, interlocking joint of the first module, in order to form a chain or edge comprised of such modules. The first bidirectional, interlocking joint has a first sawtooth and a first recess positioned adjacent to and joining the first sawtooth, such as by a continuous, planar surface that extends from the peak of the first sawtooth to the valley of the recess. The first recess is designed to receive a second sawtooth with a shape and dimensions comparable to the first sawtooth, which provides, in part, the reciprocal and flexible nature of the preferred joints. Likewise, the second bidirectional, interlocking has the second sawtooth and a second recess positioned adjacent to and joining the second sawtooth, such as by a continuous, planar surface. Once again, for the same reasons, the second recess is designed to receive a sawtooth with a shape and dimensions comparable to the first sawtooth. The first bidirectional, interlocking joint also preferably has a first flat surface extending from said first outer surface of the block body to a first sawtooth and a second flat surface extending from a second outer surface of the block body to a first recess. Similarly, the second bidirectional, interlocking joint also has a third surface extending from the outer surface of the block body to the second recess and a fourth surface extending from the second outer surface of the block body to the second sawtooth. These straight edges conceal the inner workings of the joints (e.g., the jagged nature of the edge) and help secure the modules in position.

Preferred embodiments have a number of advantages. In particular, preferred embodiments of the individual landscape blocks or units are visibly attractive as well as tremendously flexible, which is important for professional landscape designers and home gardeners alike. The bidirectional and interlocking nature of the preferred embodiments of the individual blocks or units permitted by the novel, joint design enables the overall, completed edging to assume a varying number of configurations with various shapes, including any number of circular or serpentine shapes or straight edges, as well as various sizes. In fact, curved units can be combined with straight sections. The prefabricated nature of the preferred embodiments do not require additional construction or masonry at the working site, which thereby simplifies the on-site construction, and are relatively easy to manufacture via the use of molds. The use of rigid, solid materials, such as precast concrete in preferred embodiments enables the resulting assembly to retain soil and to prevent erosion as well as to retain its shape, which thereby reduces the required maintenance. Likewise, the use of modular units with flexible, interlocking joints, enables the resulting assembly to conform to the ground surface over time, as the soil may shift, and to conform to the particular area to be edged. In addition, preferred embodiments are decorative and ecologically friendly.

Additional advantages may become apparent upon review of the detailed description and corresponding drawings.

BRIEF DESCRIPTION OF THE DRAWINGS

The accompanying drawings are incorporated into and form a part of the specification to illustrate several examples of the present inventions. These drawings together with the description serve to explain the principles of the inventions. The drawings are only for the purpose of illustrating preferred and alternative examples of how the inventions can be made and used and are not to be construed as limiting the inventions to only the illustrated and described examples. Further features and advantages will become apparent from the following and more particular description of the various embodiments of the invention, as illustrated in the accompanying drawings, wherein:

FIGS. 1, 2, 3,4, and 5 show a perspective, end, top, side, and bottom views, respectively, of first preferred embodiment 100 of decorative edging module, having a plurality (e.g., four) of pickets 18, namely pickets 18A, 18B, 18C, and 18D, organized in a straight line and having bidirectional, interlocking joints 4A and 4B, which, if able, would interlock with one another, joint 4A being positioned on one end of first preferred embodiment 100 and joint 4B being positioned on another end of first preferred embodiment 100, and joints 4A and 4B used to join one first preferred embodiment 100 with other first preferred embodiments 100 to edge a flower garden or comparable planting area;

FIGS. 6, 7, 8, 9, 10, 11, and 12 show a perspective view, interior view, top view side view, first end view, second end view, exterior view, and bottom view, respectively, of second preferred embodiment 200 of curved decorative edging module having a plurality (e.g., two) of pickets 38, namely pickets 38A and 38B, organized in a curved fashion and having bidirectional, interlocking joints 4A and 4B, which, if able, would interlock with one another, joint 4A being positioned on one end of second preferred embodiment 200 and joint 4B being positioned on another end of second preferred embodiment 200, and joints 4A and 4B used to join one second preferred embodiment 200 with other second preferred embodiments 200 to edge flower garden or comparable planting area;

DETAILED DESCRIPTION OF THE PREFERRED EMBODIMENT

Figures 9, 10:
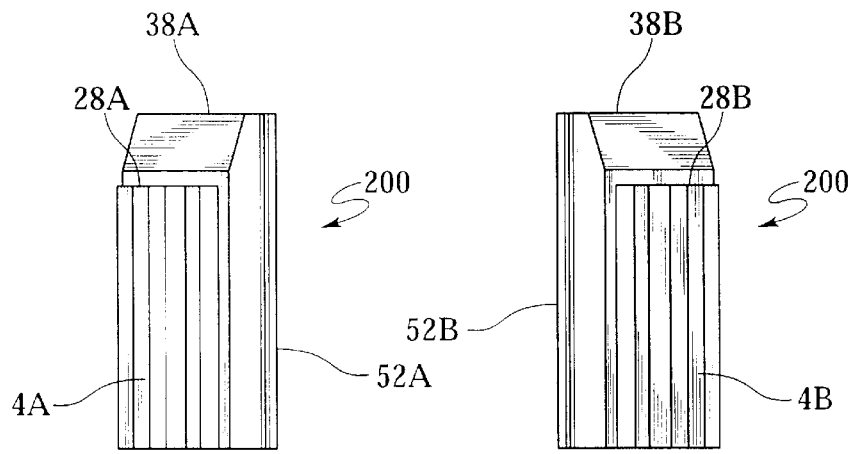
Figure 11:
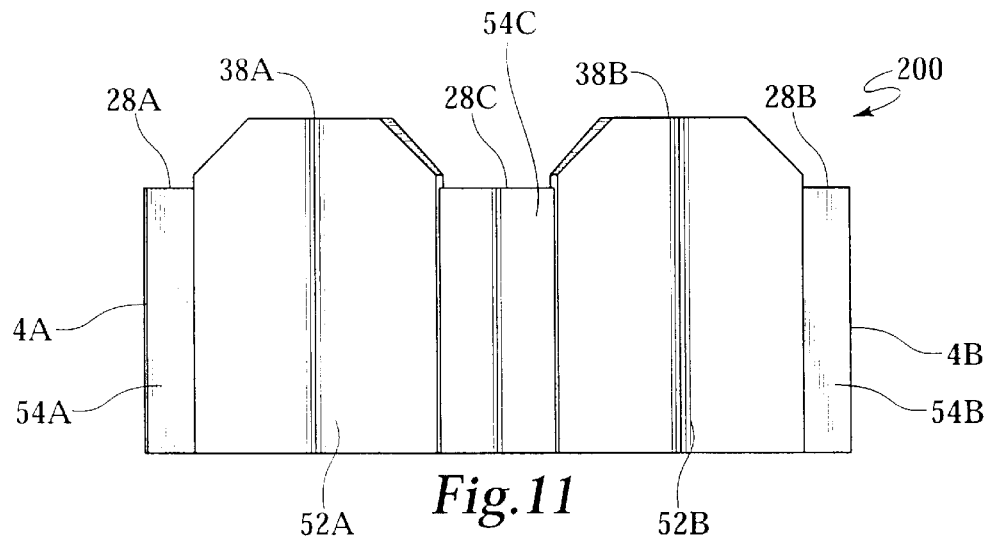
Figure 12:
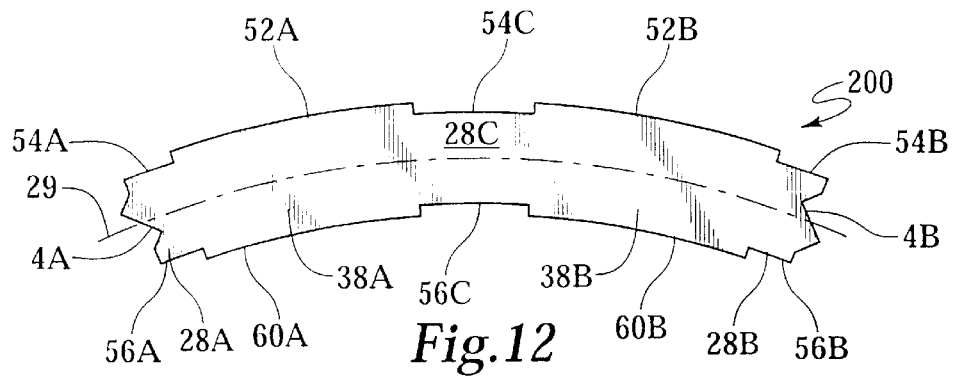

The preferred embodiment will be described by referring to apparatus showing various examples of how the inventions can be made and used. When possible, like reference characters are used throughout the several views of the drawing to indicate like or corresponding parts. Also, note that throughout the following discussion, references are made somewhat interchangeably to decorative edging with bidirectional, interlocking joints; decorative edging; individual blocks or units; decorative edging module; landscape edging unit; and precast, crushed stone or compacted concrete landscape edging modules, etc. In most cases, unless the corresponding explanation suggests otherwise, please do not attach any special significance to these slight changes in terminology. These terms were adopted and used to make the resulting application more readable.

FIGS. 1, 2, 3, 4, and 5 show a perspective view, end view, top view side view, and bottom view, respectively, of first preferred embodiment 100 of decorative edging having a plurality (e.g., four) of pickets 18, namely pickets 18A, 18B, 18C, and 18D, which are intended to resemble pickets traditionally found on a white, picket fence, manufactured from wood. Of course, first preferred embodiments 100 shown in FIGS. 1,2 3, 4, and 5 are preferably smaller than a traditional, white, picket fence and are used to edge a flower bed or the like. Further, when compared to the pickets found on a traditional, white, picket fence, the pickets in preferred embodiment 100 are joined together with a solid or rigid section of substantially the same width, rigidity, weight, and height (excluding the protruding portion) that extends substantially the length of the pickets 18A, 118B, 18C and 18D and utilize joints 4A and 4B to link various units of first preferred embodiment 100 together to slow or to prevent the erosion of dirt from the flower bed and/or to prevent the growth of certain vegetation (e.g., grass) from entering the flower bed. The joint is designed to keep the interlocked units in alignment with one another, so that a slight bump of one unit from any direction front or back, such as by a foot or lawnmower, will not knock the units from alignment.

Each of pickets 18A, 18B, 18C, and 18D have a first surface and a second surface. Specifically, picket 18A has first picket surface 2A and second picket surface 10A; picket 18B has first picket surface 2B and second picket surface 10B; picket 18C has first picket surface 2C and second picket surface 10C; and picket 18D has first picket surface 2D and second picket surface 10D. Further, picket 18A is joined with picket 18B with section 12C; picket 18B is joined with picket 18C with section 12D; and picket 18C is joined with picket 18D with section 12E. Section 12C has first section surface 8C and second section surface 6C; section 12D has first section surface 8D and second section surface 6D; and section 12E has first section surface 8E and second section surface 6E. Sections 12A and 12B, which are smaller than full sections 12C, 12D, and 12E, end with bidirectional, interlocking joints 4A and 4B, respectively. Sections 12A and 12B are approximately half the size of full sections 12C, 12D, and 12E, so that, when one first preferred embodiment 100 is joined with another first preferred embodiment 100, section 12A of one first preferred embodiment 100 when combined with section 12B of another first preferred embodiment 100 is approximately equal to full sections 12C, 12D, and 12E, so that the seam formed at the location in which joint 4A of one first preferred embodiment 100 joins joint 4B of another first preferred embodiment 100 is disguised or otherwise not easily visible. In short, since the dimensions of section 12A of one first preferred embodiment 100 when combined with another section 12B of another first preferred embodiment 100 are virtually identical to the other full sections 12C, 12D, and 12E of either of the first preferred embodiments 100, the resulting combination utilizes a pattern apparent from the side and the top that is continuous and relatively consistent, as the pattern of pickets and the joining units is repetitive. Also, note that first preferred embodiment 100 is straight, solid, rigid, and continuous structure and has sufficient width, height, and weight to hold dirt or other gardening material in place on one side of first preferred embodiment 100, such as along surfaces 6A, 10A, 6C, 10B, 6D, 10C, 6E, 10D, and 6B.

FIGS. 6, 7, 8, 9, 10, 11, and 12 show a perspective view, interior view, top view, side view, first end view, second end view, exterior view, and bottom view, respectively, of second preferred embodiment 200 of curved decorative edging having a plurality (e.g., two) of pickets 38, namely pickets 38A and 38B, which, as with the first preferred embodiment 100, are intended to resemble pickets traditionally found on a white, picket fence, manufactured of wood. Of course, second preferred embodiments 200 shown in FIGS. 6, 7, 8, 9, 10, 11, and 12 are in some cases smaller than a traditional picket fence and are used to edge a flower bed or the like. Further, as with first preferred embodiment, when compared to the pickets found on a traditional, white, picket fence, the pickets in preferred embodiment 200 are joined together with a solid or rigid section of substantially the same width, rigidity, weight, and height (excluding the protruding portion) that extends substantially the length of the pickets 38A and 38B and utilize joints 4A and 4B to link various units of first preferred embodiment 200 together to slow or to prevent the erosion of dirt from the flower bed and/or the growth of certain vegetation (e.g., grass) from entering the flower bed. Also, as discussed above, the joint is designed to keep the interlocked units in alignment with one another, so that a slight bump of one unit from any direction front or back, such as by a foot or lawnmower, will not knock the units from alignment.

Each of pickets 38A and 38B have a first picket surface and a second surface. Specifically, picket 38A has first picket surface 52A and second picket surface 60A and picket 18B has first picket surface 52B and second picket surface 60B. Further, picket 38A is joined with picket 38B with section 28C, having first section surface 54C and second section surface 56C. Section 28A has first section surface 54A and second section surface 56A; and section 28B has first section surface 54B and second section surface 56B. Sections 28A and 28B, which are smaller than full section 28C, end with bidirectional, interlocking joints 4A and 4B, respectively. Sections 28A and 28B are approximately half the size of full size section 28C, so that, when one preferred embodiment 200 is joined with another preferred embodiment 200, section 28A of one second preferred embodiment 200 when combined with another second preferred embodiment 200 is approximately equal to full section 28C, so that the seam at the location that joint 4A of one second preferred embodiment 200 and joint 4B of another second preferred embodiment 200 is disguised or not easily visible. In short, as with first embodiment 100, since the dimensions of section 28A of one first preferred embodiment 200 when combined with another section 28B of another second preferred embodiment 200 is virtually identical to full section 28C of either of the second preferred embodiments 200, the resulting combination utilizes a pattern apparent from the side and top that is continuous and relatively consistent, as the pattern of pickets and joining unit is repetitive, as shown in the perspective view often (10) second preferred embodiments 200 assembled together into a circular assembly 500 in FIG. 20, which corresponds the circular assembly 500 shown in FIG. 17.

Figure 20:
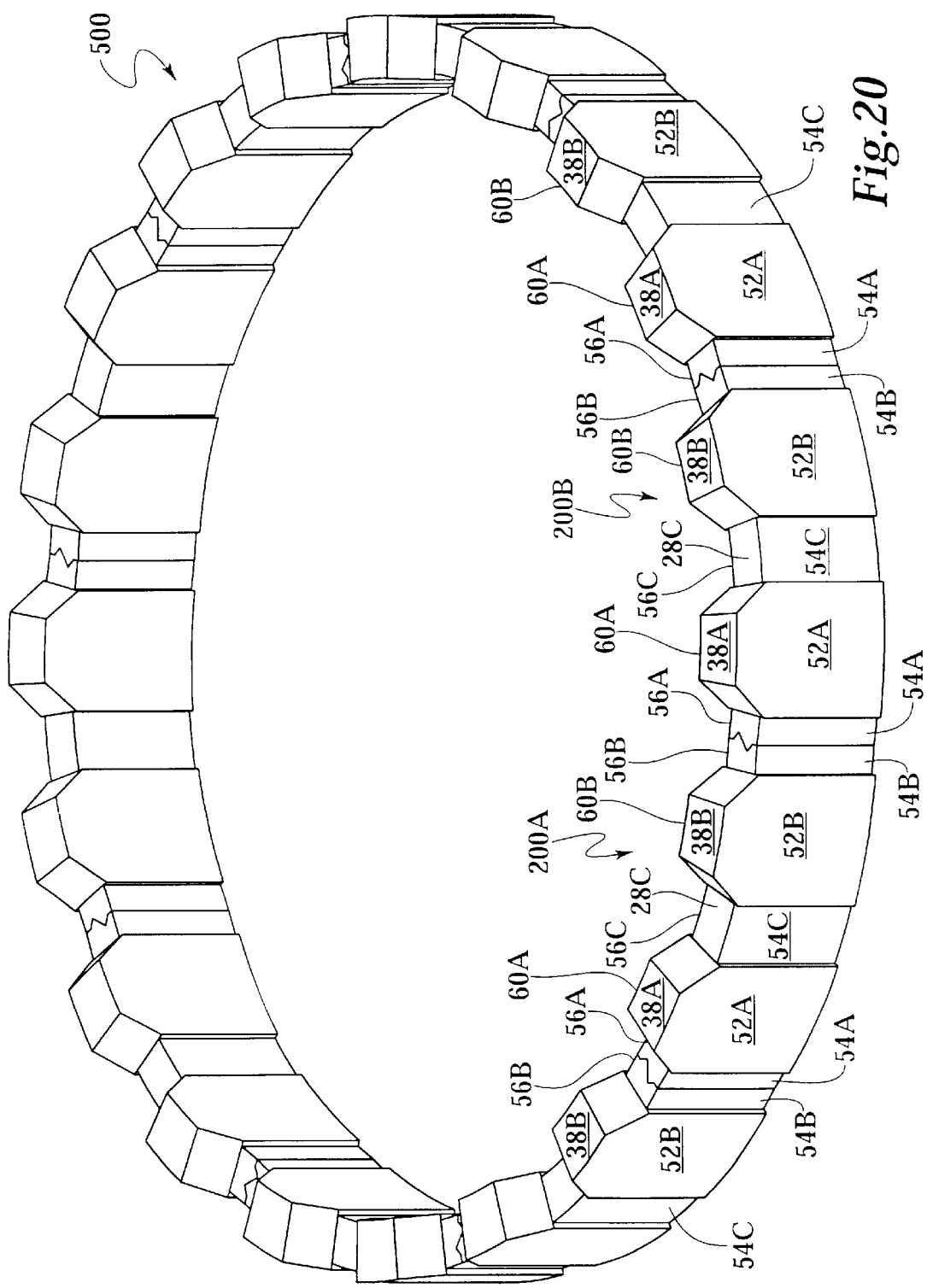
FIG. 20 shows a perspective view of circular configuration 500, having the same number of second preferred embodiments 200 as the circular configuration shown in FIG. 17, namely ten (10) second preferred embodiments 200.

Referring to FIG. 20, in order to understand the respective orientation and use of second preferred embodiments 200 in FIG. 20, two (2) second preferred embodiments 200, namely 200A and 200B, have been labeled with similar numbers used in FIGS. 6–12, along with additionally labeled units. Second preferred embodiment 200 is curved, solid, rigid, and continuous structure and has sufficient width, height, and weight to hold dirt or other gardening material in place on one side of second preferred embodiment 200, such as along surfaces 56A, 60A, 56C, 60B, and 56B.

Figure 13:
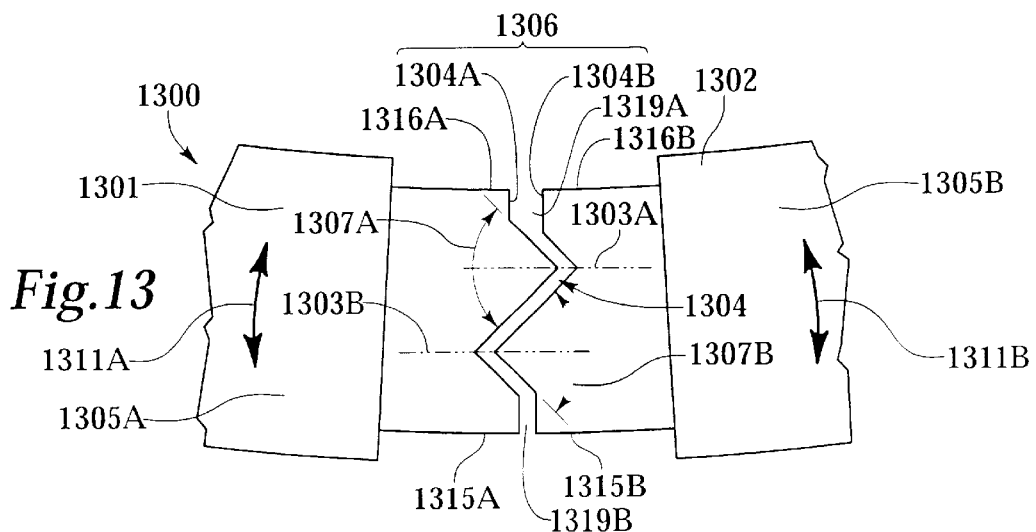
FIG. 13 is a top view a first preferred embodiment 1300 of a bidirectional, interlocking joint 1304, joining units 1301 and 1302.
Figure 14:
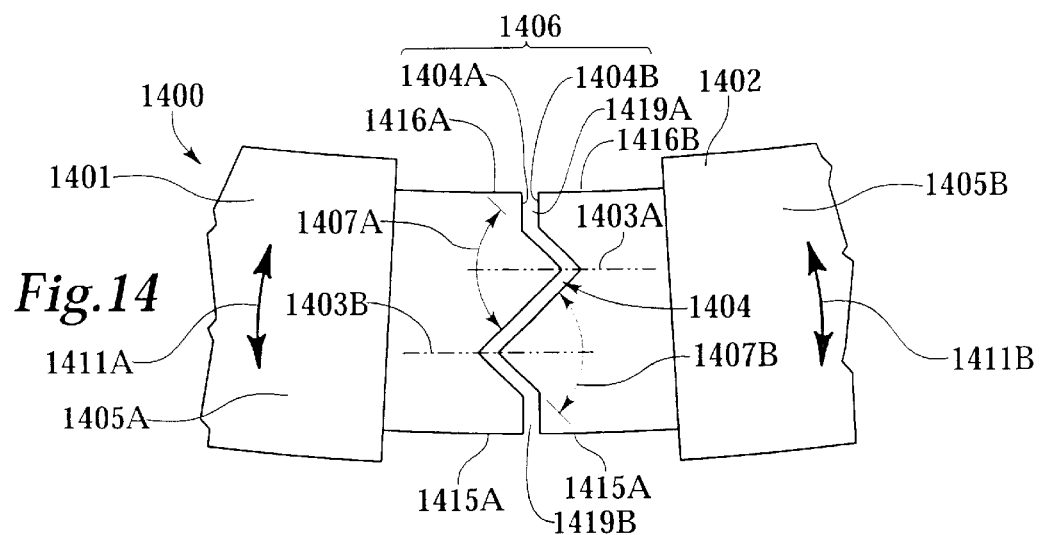
FIG. 14 is a top view a second preferred embodiment 1400 of a bidirectional, interlocking joint 1404, joining units 1401 and 1402.
Figure 15:
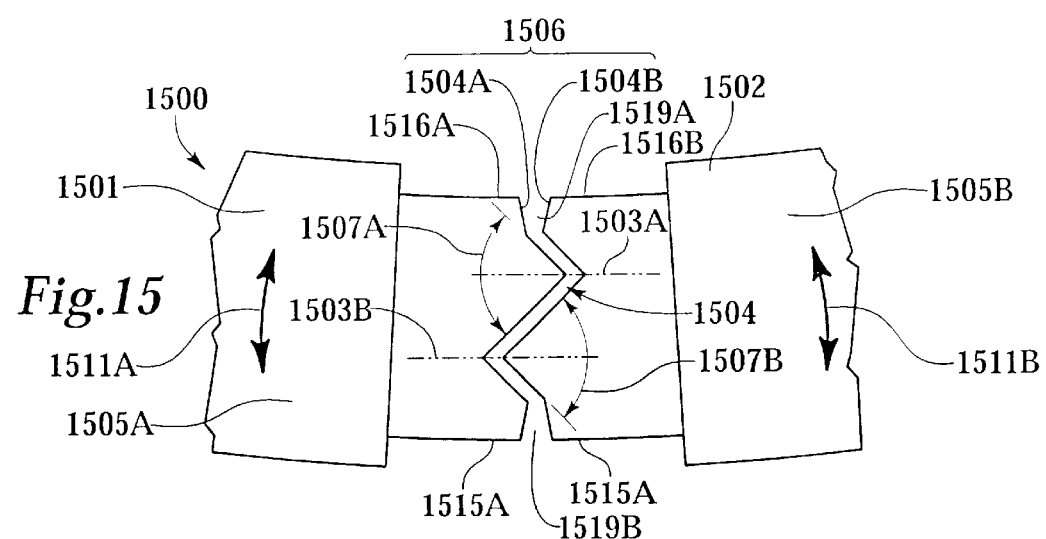
FIG. 15 is a top view a third preferred embodiment 1500 of a bidirectional, interlocking joint 1504, joining units 1501 and 1502.

One advantage of joints 4A and 4B, the placement and the nature of which will be explained in more detail below in reference to FIGS. 13, 14, and 15, is that it enables the flexible use of second preferred embodiment 200 and the easy design of circular assemblies of various sizes and dimensions (e.g., different diameters). For example, circular assembly 400 in FIG. 16, having a diameter 401 of 36 inches, incorporates nine (9) second preferred embodiments 200; circular assembly 500 in FIG. 17, having a diameter 501 of 40 inches, incorporates ten (10) second preferred embodiments 200; and circular assembly 600 in FIG. 18, having a diameter 601 of 44 inches, incorporates eleven (11) second preferred embodiments 200. While a small gap at the joints is visible from a location outside of circular assembly 400 in FIG. 16 and a small gap at the joints is visible from a location inside of circular assembly 600 in FIG. 18, no gap should at the joints should be present in circular assembly 500 in FIG. 17.

Figure 19:
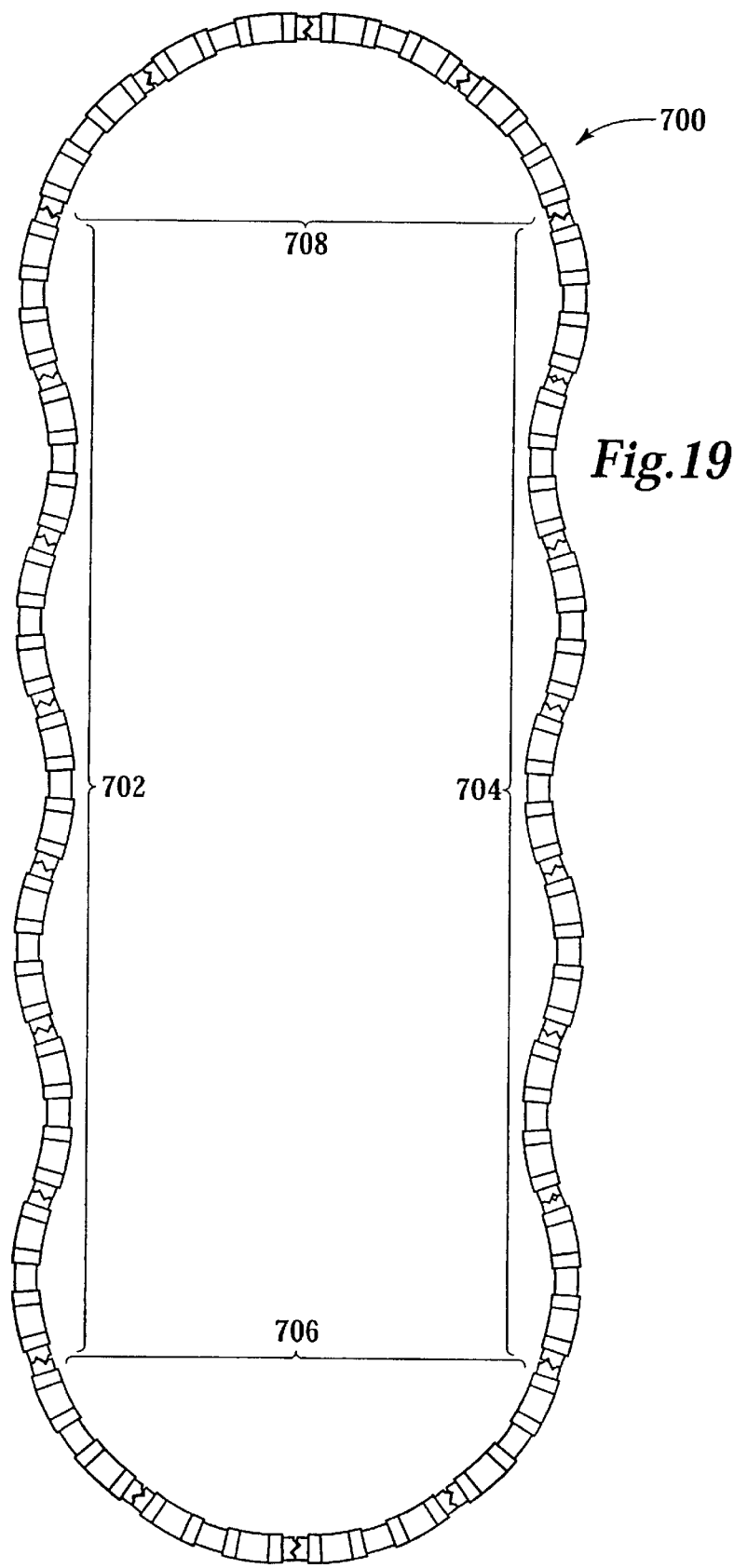
FIG. 19 shows a serpentine configuration 700, incorporating numerous second preferred embodiments 200.

In addition, the smaller size of second preferred embodiment 200, namely the length, and the presence of only two pickets 18A and 18B, contributes to the flexibility of the second preferred embodiment. Likewise, the curvature of second preferred embodiment 200 or the angle that second preferred embodiment 200 is curved preferably produces a circle to the center of the embodiment (e.g., curvature 29 shown in FIGS. 8 and 12) that has a 40 inch diameter or a 20 inch radius, which also contributes to the flexibility of second preferred embodiment 200. Further, as shown in FIGS. 19, 21A, 21B, and 21C, the bidirectional nature of the joints 4A and 4B means that the individual units of second preferred embodiment 200 can be combined, linked, positioned, or oriented together in such a manner that the surfaces positioned on the interior region of second preferred embodiment 200, namely second section surface 56A, second picket surface 60A, second section surface 56C, second picket surface 60B, and second section surface 56B in FIGS. 6, 7, 8, 9, 10, 11, and 12, can be oriented in a different direction that the comparable interior surfaces of the preceding second preferred embodiment 200 in a chain of preferred embodiments 200 or the subsequent preferred embodiment 200 in a chain of preferred embodiments 200 to create a serpentine or winding decorative garden edge (sections 702 and 704 of assembly 700 in FIG. 19). In other words, as shown in FIGS. 19 and 21A, 21B, and 21C, during the serpentine portion, section surfaces 56A, picket surface 60A, section surface 60B, and section surface 56B of one preferred embodiment may face toward the interior of the flower bed (e.g., toward the flowers), but on the next preferred embodiment 200 in line may face toward the outside of the flower garden (e.g., away from the flowers). Alternatively, in the same configuration, as shown in FIG. 19, several second preferred embodiments 200 can be combined, linked, positioned, or oriented together to create a substantially curved section, such as sections 706 and 708 of assembly 700 in FIG. 19. This flexibility provides a tremendous amount of options for the garden designer to design the respective flower beds, around trees, bushes, or other garden structures.

Figure 21A:
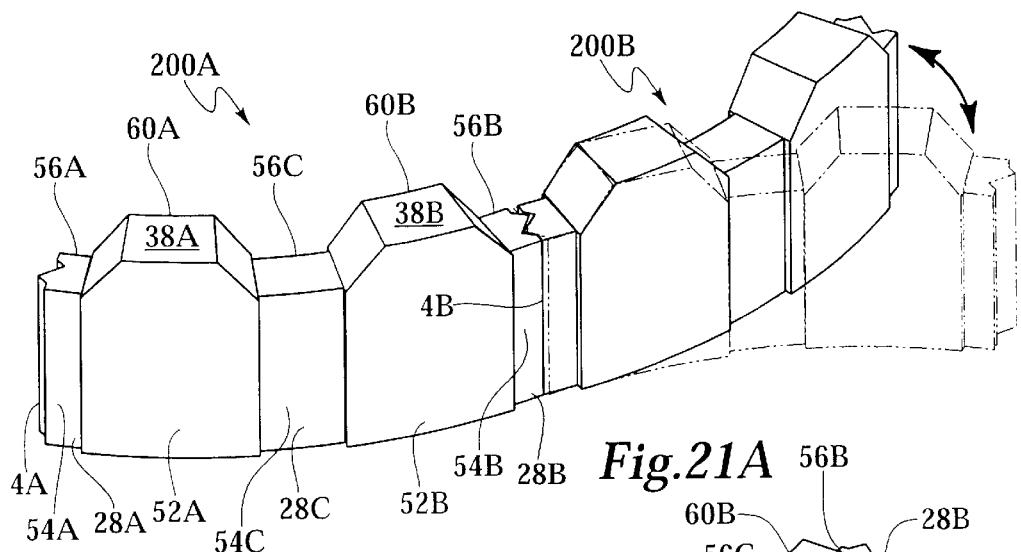
FIGS. 21A, 21B, and 21C shows the flexibility and bidirectional nature of second preferred embodiment 200, due to the use of bidirectional, interlocking joint.
Figure 21B:
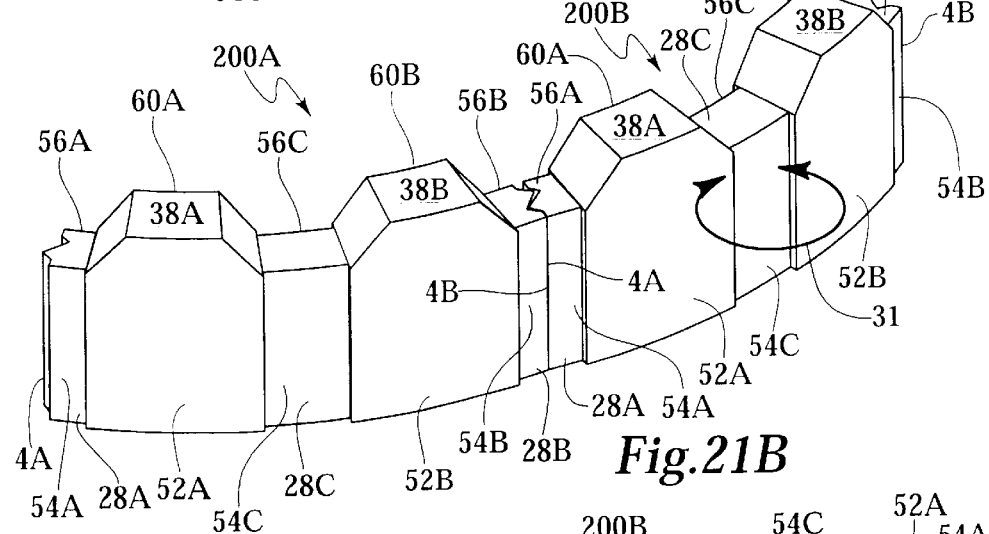
Figure 21C:
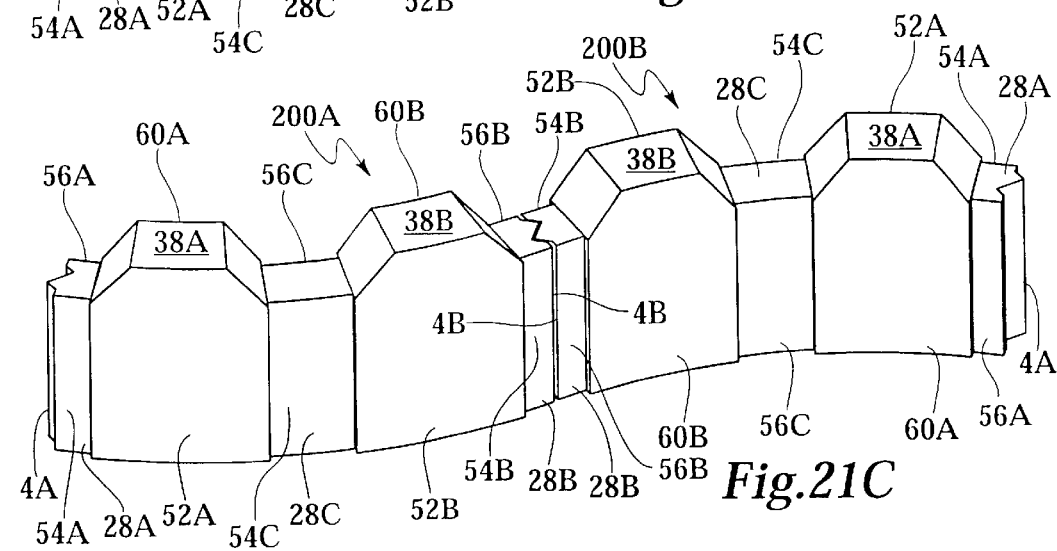

The bidirectional nature of joints 4A and 4B is shown in more detail in FIGS. 21A, 21B, and 21C. The reference numbers used in FIGS. 21A, 21B, and 21C correspond to the reference numbers used in FIGS. 6, 7, 8, 9, 10, 11, and 12 that show the second preferred embodiment 200 (200A and 200B). As shown in FIGS. 21A, 21B, and 21C, preferred embodiment 200B can be rotated according to the circular direction 31 and joint 4B of preferred embodiment 200A can work with either joint 4A or joint 4B of preferred embodiment 200B.

FIGS. 13, 14, and 15 show atop view of bidirectional, interlocking joint 4A and 4B used in first preferred embodiment 100 and second preferred embodiment 200, with the primary difference being the variation and shape of gaps 1319A and 1319B (in FIG. 13), 1419A and 1419B (in FIG. 14), and 1519A and 1519B (in FIG. 15) within a single embodiment and of the variation and the shape of gaps 1319A, 1419A, and 1519A and gaps 1319B, 1419B, and 1519B, between embodiments, respectively.

Figure 16:
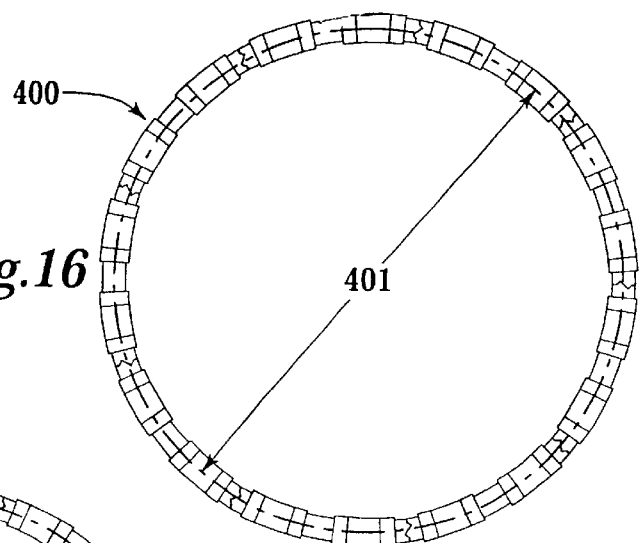
FIGS. 16, 17, and 18 show circular configurations 400, 500, and 600, respectively, incorporating various numbers of second preferred embodiments 200.
Figure 17:
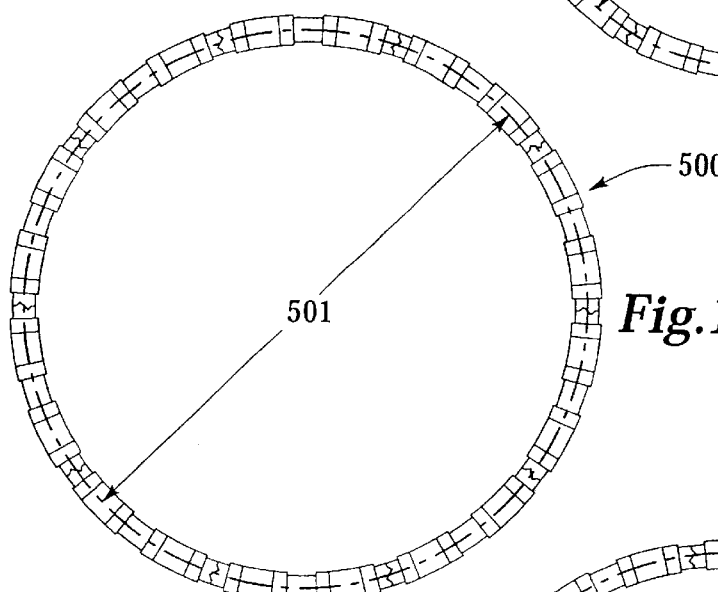
Figure 18:
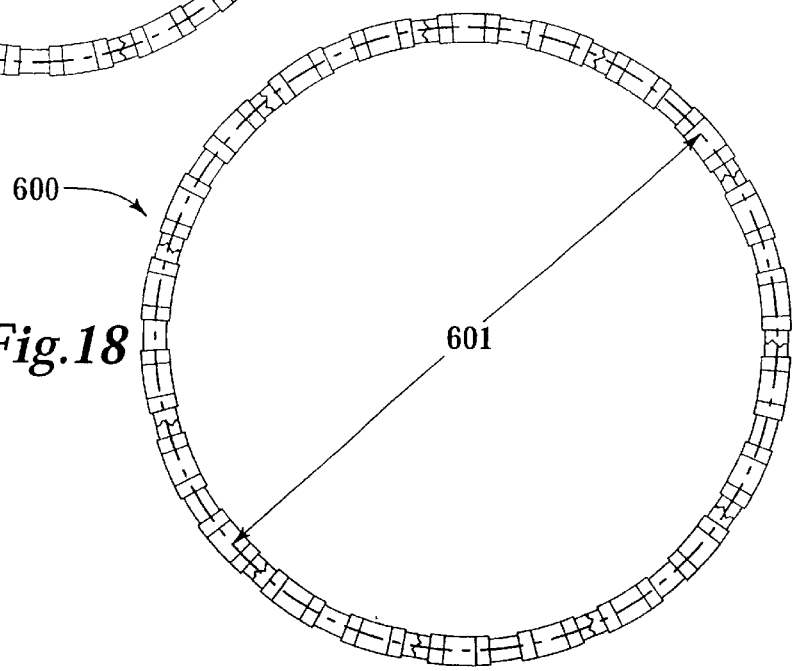

Referring to FIG. 13, joint 1304 is created by combining joint 1304A of unit 1301 and joint 1304B of unit 1302 to form joint 1304 and is preferably in the center of section 1306. Units 1301 and 1302, with pickets 1305A and 1305B and section 1306, of FIG. 13 corresponds to second preferred embodiment 200, with pickets 38A and 38B and section 28C, in FIGS. 6, 7, 8, 9, 10, 11, and 12, but, of course, could also correspond to first preferred embodiment 100 shown in FIGS. 1, 2, 3, 4, and 5 and the corresponding subparts. Joint 1304A and 1304B are configured such that they align together when positioned as shown in FIG. 13, but note that the nature of joint 1304 permits units 1301 and 1302 to rotate in or out in the direction shown by lines 1311A and 1311B to make the resulting circular assembly larger or smaller, as shown in FIGS. 16, 17, and 18, or to change direction altogether, as shown in FIGS. 21A, 21B, and 21C, in order to create the serpentine assembly shown in sections 702 and 704 of FIG. 19.

Joints 1304A and 1304B preferably incorporate the use of two (2) axes 1303A and 1303B, approximately positioned at locations equidistant from each other and from the outside surfaces 1315A and 1315B and interior surfaces 1316A and 1316B. In other words, axis 1303A and 1303B are positioned at locations marking one third (⅓) of the distance from exterior surfaces 1315A and 1315B and interior surfaces 1316A and 1316B. Note the use of the word interior and exterior is mostly for convenience, the word interior loosely referring to the interior region of a circular flower bed and the word exterior loosely referring to the exterior region of a circular flower bed. Of course, these words can be alternated, depending upon which region is regarded as the interior and which region is regarded as the exterior. Further, joint 1304 bends or otherwise changes direction (e.g., left to right) at the respective axis 1303A and 1303B, such that joint 1304 changes from being oriented left or traversing left (when looking down on the combination of units 1301 and 1302) at a 45° angle from the horizontal to traversing right at axis 1303B at a 45° angle from the horizontal and from being oriented right or traversing right (when looking down on the combination of units 1301 and 1302) at a 45° angle from the horizontal to traversing left at axis 1303A at a 45° angle from the horizontal to create corresponding sawtooth and recess pairs. The angle of the bend or change of direction, namely angles 1307A and 1307B, in the preferred embodiment 1300 shown in FIG. 13, which are equal to one another, and is preferably equal to 90°. However, angles 1307A and 1307B could have different, preferably equal amounts, such as 30°, or, perhaps, varying amounts, but angles of equal amounts (e.g., 90°) provide the greatest flexibility. This design creates a sawtooth and corresponding recess adapted to receive a sawtooth of similar design. The crooked or jagged nature of joint 1304 permits units 1301 and 1302 to interlock with one another without the use of mortar and also to prevent the erosion of dirt or soil from the flower bed created by the use of such edging. Once again, this joint is designed to keep the interlocked units in alignment with one another, so that a slight bump of one unit from any direction front or back, such as by a foot or lawnmower, will not knock the units from alignment.

The use of two axises also creates two (2) pivot points about which the units 1301 and 1302 may rotate, rather than just one, so that the units 1301 and 1302 can interlock with one another, so that dirt is not able to push over either unit 1301 and 1302 or otherwise travel between joints 1304. At the same time, the use of two (2) axises provides the flexibility to change the size of the resulting circular assembly, such as that found in FIGS. 16, 17, and 18, or create a serpentine assembly, such as that found in FIG. 20. In addition, the use of a straight surfaces along gap 1319A and 1319B initially conceals the jagged edge created by the change of directions of the seam at each of the two axis. Further, the width of gap 1319A is larger than the width of gap 1319B, which permits greater rotation of units 1301 and 1302 toward one another to reduce the size of the circular assembly partially created by units 1301 and 1302.

Similar to FIG. 13, FIG. 14 shows joint 1404 created by combining joint 1404A of unit 1401 and joint 1404B of unit 1402 to form joint 1304, preferably in the center of section 1406. Units 1401 and 1402, with pickets 1405A and 1405B and section 1406, of FIG. 14 correspond to second preferred embodiment 200, with pickets 38A and 38B and section 28C, in FIGS. 6, 7, 8, 9, 10, 11, and 12, but, of course, could also correspond to first preferred embodiment 100 shown in FIGS. 1, 2, 3, 4, and 5 and the corresponding subparts. Joint 1404A and 1404B are configured such that they align together when positioned as shown in FIG. 14, but note that the nature of joint 1404 permits units 1401 and 1402 to rotate in or out in the direction shown by lines 1411A and 1411B to make the resulting circular assembly larger or smaller, as shown in FIGS. 16, 17, and 18 or to change direction altogether, as shown in FIG. 21, to create the serpentine assembly shown in sections 702 and 704 of FIG. 19.

Once again, joints 1404A and 1404B preferably incorporate the use of two (2) axises 1403A and 1403B, approximately positioned at locations equidistant from each other and from the outside surfaces 1415A and 1415B and interior surfaces 1416A and 1416B. In other words, axis 1403A and 1403B are positioned at locations marking one third (⅓) of the distance from exterior surfaces 1415A and 1415B and interior surfaces 1416A and 1416B. Note the use of the word interior and exterior is mostly for convenience, the word interior loosely referring to the interior region of a circular flower bed and the word exterior loosely referring to the exterior region of a circular flower bed. Of course, as stated above, these words can be alternated, depending upon which region is regarded as the interior and which region is regarded as the exterior. Further, joint 1404 bends or otherwise changes direction (e.g., left to right) at the respective axis 1403A and 1403B, such that joint 1404 changes from being oriented left or traversing left (when looking down on the combination of units 1401 and 1402) at a 45° angle from the horizontal to traversing right at axis 1403B at a 45° angle from the horizontal and from being oriented right or traversing right (when looking down on the combination of units 1401 and 1402) at a 45° angle from the horizontal to traversing left at a 45° angle from the horizontal at axis 1403A at a 45° angle from the horizontal to create corresponding sawtooth and recess pairs. The angle of the bend or change of direction, namely angles 1407A and 1407B, in the preferred embodiment 1400 shown in FIG. 14, which are equal to one another, and is equal to 90°. However, angles 1407A and 1407B could have different, equal amounts, such as 30°, or, perhaps, varying amounts, but angles of equal amounts (e.g., 90°) provide the greatest flexibility. The crooked or jagged nature of joint 1404 permits units 1401 and 1402 to interlock with one another without the use of mortar and also to prevent the erosion of dirt or soil from the flower bed created by the use of such edging. As with the other joints, this joint is designed to keep the interlocked units in alignment with one another, so that a slight bump of one unit from any direction front or back, such as by a foot or lawnmower, will not knock the units from alignment.

The use of two (2) axises also creates two (2) pivot points about which the units 1401 and 1402 may rotate, rather than just one, so that the units 1401 and 1402 can interlock with one another, so that dirt is not able to push over either unit 1401 and 1402 or otherwise travel between joint 1304. At the same time, joint 1304 provides some flexibility to change the size of the resulting circular assembly, such as that found in FIGS. 16, 17, and 18, or create a serpentine assembly, such as that found in FIG. 20. In addition, the use of a straight surfaces along gap 1419A and 1419B initially conceals the jagged edge created by the change of directions of the seam at each of the two (2) axises. Further, the width of gap 1419A is identical to the width of gap 1419B, which permits equal rotation of units 1401 and 1402 toward one another or away from one another to reduce the size of the circular assembly partially created by units 1401 and 1402.

Referring to FIG. 15, joint 1504 is created by combining joint 1504A of unit 1501 and joint 1504B of unit 1502 to form joint 1304 and is preferably in the center of section 1506. Units 1501 and 1502, with pickets 1505A and 1505B and section 1506, of FIG. 15 corresponds to second preferred embodiment 200, with pickets 38A and 38B and sections 28C, in FIGS. 6, 7, 8, 9, 10, 11, and 12, but, of course, could also correspond to first preferred embodiment 100 shown in FIGS. 1, 2, 3, 4, and 5 and the corresponding subparts. Joint 1504A and 1504B are configured such that they align together when positioned as shown in FIG. 15, but note that the nature of joint 1504 permits units 1501 and 1502 to rotate in or out in the direction shown by lines 1511A and 1511B to make the resulting circular assembly larger or smaller, as shown in FIGS. 16, 17, and 18 or to change direction altogether, as shown in FIGS. 21A, 21B, and 21C, to create the serpentine assembly shown in sections 702 and 704 of FIG. 19.

Again, joints 1504A and 1504B preferably incorporate the use of two (2) axises 1503A and 1503B, approximately positioned at locations equidistant from each other and from the outside surfaces 1515A and 1515B and interior surfaces 1516A and 1516B. In other words, axis 1503A and 1503B are positioned at locations marking one third (⅓) of the distance from exterior surfaces 1515A and 1515B and interior surfaces 1516A and 1516B. Note the use of the word interior and exterior is mostly for convenience, the word interior loosely referring to the interior region of a circular flower bed and the word exterior loosely referring to the exterior region of a circular flower bed. Of course, these words can be alternated, depending upon which region is regarded as the interior and which region is regarded as the exterior. Further, joint 1504 bends or otherwise changes direction (e.g., left to right) at the respective axis 1503A and 1503B, such that joint 1504 changes from being oriented left or traversing left (when looking down on the combination of units 1501 and 1502) at a 45° angle from the horizontal to traversing right at axis 1503B at a 45° angle from the horizontal and from being oriented right or traversing right (when looking down on the combination of units 1501 and 1502) to traversing left at axis 1503A at a 45° angle from the horizontal to create corresponding sawtooth and recess pairs. The angle of the bend or change of direction, namely angles 1507A and 1507B, in the preferred embodiment 1500 shown in FIG. 15, which are equal to one another, is preferably equal to 90°. However, angles 1507A and 1507B could have different, equal amounts, such as 30°, or, perhaps, varying amounts, but angles of equal amounts (e.g., 90°) provide the greatest flexibility. The crooked or jagged nature of joint 1504 permits units 1501 and 1502 to interlock with one another without the use of mortar and also to prevent the erosion of dirt or soil from the flower bed created by the use of such edging.

The use of two (2) axises also creates two (2) pivot points about which the units 1501 and 1502 may rotate, rather than just one, so that the units 1501 and 1502 can interlock with one another, so that dirt is not able to push over either unit 1501 and 1502 or otherwise travel between joint 1504. At the same time, the use of two (2) axises provides the flexibility to change the size of the resulting circular assembly, such as that found in FIGS. 16, 17, and 18, or create a serpentine assembly, such as that found in FIG. 20. In addition, straightening out the direction of the seam and the use of a straight joint across region 1506 initially conceals the jagged edge created by the change of directions of the seam at each of the two axis. Further, the width and shape of gap 1519A is equal to the width and shape of gap 1519B, which permits rotation of units 1501 and 1502 toward one another to reduce the size of the circular assembly partially created by units 1501 and 1502 and away from one another to increase the size of the circular assembly partially created by units 1501 and 1502. The slanted or opening nature of gaps 1519 and 1519B provide more flexibility to rotate units 1501 and 1502 than the use of gaps 1419A and 1419B used in FIG. 14, but also reveals more of the inner surfaces of joint 1504.

Further Modifications and Variations

Although the invention has been described with reference to a few specific embodiments, this description is not meant to be construed in a limiting sense. Thus, the embodiments shown and described above are only intended as an example. Various modifications of the disclosed embodiment as well as alternate embodiments of the invention will become apparent to persons skilled in the art upon reference to the description of the invention. For instance, alternate shapes of pickets, such as triangular shaped pickets, pointed pickets, etc., may be adopted and utilized. Further, while the preferred embodiments described above are a manufactured dry cast landscape product and are manufactured with crushed stone, sand, water, and, in some cases, certain types of pigment to colorize the edging product, alternate materials may be used, such as wood, concrete, or plastic, so long as the materials used result in a rigid, fixed structure (both the pickets and joining regions) to function as permanent or semi-permanent garden edging. Also, the angles referenced above may vary.

Thus, even though numerous characteristics and advantages of the present inventions have been set forth in the foregoing description, together with details of the structure and function of the inventions, the disclosure is illustrative only, and changes may be made in the detail, especially in matters of shape, size and arrangement of the parts within the principles of the inventions to the full extent indicated by the broad general meaning of the terms used in the attached claims. Accordingly, it should be understood that the modifications and variations suggested above and below are not intended to the exhaustive. These examples help show the scope of the inventive concepts, which are covered in the appended claims. The appended claims are intended to cover these modifications and alternate embodiments.

In short, the description and drawings of the specific examples above are not intended to point out what an infringement of this patent would be, but are to provide at least one explanation of how to make and use the inventions contained herein. The limits of the inventions and the bounds of the patent protection are measured by and defined in the following claims.

What is claimed is:

1. A landscape edging unit, comprising:
   (a) a body having a first outer surface and a second outer surface; and
   (b) a first end having a first end surface extending from said first outer surface to said second outer surface and adapted to prevent slippage and to interlock with a second landscape edging unit similar to said landscape edging unit in that said second landscape edging unit has a second body having a second end having a second end surface extending from a third outer surface of said second body to a fourth outer surface of said second body, said first end surface and said second end surface reversible, identical and interchangeable with one another,
   said first end surface when positioned to interlock with said second end surface forms
      a first gap between said first end surface and said second end surface at a first intersection between said first end surface and said first outer surface of said body and at a third intersection between said second end surface and said third outer surface of said second body and
      a second gap between said first end surface and said second end surface at a second intersection between said first end surface and said second outer surface of said body and at a fourth intersection between said second end surface and said fourth outer surface of said second body.

2. The landscape edging unit of claim 1, wherein said body is curved.

3. The landscape edging unit of claim 1, wherein
   said first end surface has a first end peak and a first end recess and
   said second end surface has a second end peak and a second end recess,
   said first end peak designed to fit into said second end recess and
   said second end peak designed to fit into said first end recess.

4. The landscape edging unit of claim 3, wherein said first end peak and said second end peak are pointed.

5. The landscape edging unit of claim 3, wherein said first end peak and said second end peak are pointed.

6. The landscape edging unit of claim 1, wherein said first end surface is comprised of a first geometric section, a second geometric section, a third geometric section, and a fourth geometric section,
   said first geometric section connected to said first outer surface of said body and to said second geometric surface,
   said second geometric section connected to said first geometric section and to said third geometric section,
   said third geometric section connected to said second geometric section and to said fourth geometric section and
   said fourth geometric section connected to said third geometric section and to said second outer surface of said body,
   said first geometric section substantially perpendicular to said first outer surface of said body,
   said fourth geometric section substantially perpendicular to said second outer surface of said body.

7. The landscape edging unit of claim 6, wherein said second geometric section and said third geometric section are complementary to one another.

8. The landscape edging unit of claim 6, wherein said second geometric section intersects said first geometric section at a first angle and said third geometric section intersects said fourth geometric section at a second angle.

9. The landscape unit of claim 8, wherein said first angle and said second angle are equal to 45 degrees.

10. The landscape unit of claim 8, wherein said first angle and said second angle are equal to one another.

11. The landscape unit of claim 6, wherein said second geometric region and said third geometric region intersect one another at a right angle.

12. The landscape edging unit of claim 1, wherein said first outer surface and said second outer surface are substantially parallel to one another.

13. The landscape edging unit of claim 1, wherein said body is comprised of precast concrete.

14. The landscape edging unit of claim 1, wherein said body is comprised of crushed stone, sand, water, and pigment.

15. The landscape edging unit of claim 1, wherein said body has at least one pointed protrusion extending from said body.

16. The landscape edging unit of claim 1, wherein said body is divided into a first picket region, a second picket region, and a joining region, said first picket region connected to and positioned between said first outer surface and said second outer surface and having at least one first protrusion extending therefrom, said second picket region connected to and positioned between said first outer surface and said second outer surface and having at least one second protrusion extending therefrom, said joining region joining and positioned between said first picket region and said second picket region and between said first outer surface and said second outer surface.

17. The landscape edging unit of claim 16, wherein a first portion of said first picket region upon which said first protrusion is based, a second portion of said second picket region upon which said second protrusion is based, and said joining section are comparable in size.

18. The landscape edging unit of claim 16, wherein a first portion of said first picket region upon which said first protrusion is based, a second portion of said second picket region upon which said second protrusion is based, and said joining section are comparable in width and length.

19. The landscape edging unit of claim 1, wherein said body is colorized.

20. The landscape edging unit of claim 1, wherein said first end surface has a first sawtooth and a first end recess positioned adjacent to and joining said first sawtooth and said second end surface has a second sawtooth and a second end recess positioned adjacent to and joining said second sawtooth, said first end recess designed to receive said second sawtooth, said second end recess designed to receive said first sawtooth, said first sawtooth and said second sawtooth having comparable shapes and dimensions.

21. The landscape edging unit of claim 20, wherein said first sawtooth and said second sawtooth are pointed.

22. The landscape unit of claim 1, wherein said landscape unit is comprised of a material selected from a group consisting of precrushed stone or precast concrete.

23. The landscape edging unit of claim 1, wherein sad first outer surface and said second outer surface are identical in appearance.

24. The landscape edging unit of claim 1, wherein said first gap and said second gap permitting said landscape edging unit and said second edging unit to rotate and yet remain interlocked with one another.

25. The landscape edging unit of claim 1, wherein said first end surface is comprised of a first geometric section and second geometric section and said second end surface is comprised of a third geometric section and a fourth geometric section, and further wherein said first gap is formed between said first geometric section of said first end surface and said third geometric section of said second end surface and said second gap is formed between said second geometric section of said first end surface and said fourth geometric section of said second end surface.

26. The landscape edging unit of claim 25, wherein said first gap is the widest between said first intersection and said third intersection and said second gap is the widest between said second intersection and said fourth intersection.

27. The landscape edging unit of claim 25, wherein said first gap is uniform between said first geometric section and said third geometric section and said second gap is uniform between said second geometric section and said fourth geometric section.

28. A precast landscape edging unit, comprising:
(a) a body having a first outer surface and a second outer surface; and
(b) a first end extending from said first outer surface to said second outer surface; and
(c) a first joint means disposed on said first end surface wherein said first joint means is adapted to prevent slippage and to interlock with a second joint means disposed in a second end surface of a second body of a second precast landscape edging unit to create a joint, said first joint means when interlocked with said second joint means of said second end surface of said second body of said second precast landscape edging unit permits rotation of said body and said second body around said joint, said first joint means and said second joint means reversible, identical and interchangeable with one another.

29. The precast landscape edging to claim 28, wherein said first joint means is comprised with a first sawtooth and a first end recess positioned adjacent to and joining said first sawtooth designed to receive a second sawtooth, said first sawtooth and said second sawtooth having comparable shapes and dimensions and further wherein said second joint means is comprised with said second sawtooth and a second end recess positioned adjacent to and joining said second sawtooth designed to receive said first sawtooth, said first end recess and said second end recess comparable in shape and size.

30. The landscape edging unit of claim 29, wherein said first sawtooth and said second sawtooth are pointed.

31. The precast landscape edging unit of claim 29, wherein said first sawtooth and said second sawtooth are pointed at the tip.

32. The precut landscape edging unit of claim 28, wherein said outer surface and said second outer surface are identical in appearance.

33. A precast, landscape edging module, comprising:
(a) a block body having a first outer surface and a second outer surface and a first end surface extending from said first outer surface to said second outer surface and a second end surface extending from said first outer surface to said second outer surface, and
(b) a first bidirectional, interlocking first joint disposed on said first end surface and a second bidirectional, interlocking joint disposed on said second end surface, wherein said first bidirectional, interlocking joint adapted to interlock with said second bidirectional, interlocking joint to prevent slippage and to enable partial rotation of said block body around said first bidirectional, interlocking joint or around said second bidirectional, interlocking joint.

34. The precast, landscape edging module of claim 33, wherein said first bidirectional, interlocking joint has a first peak centered on a first axis and a first recess centered on a second axis and said second bidirectional, interlocking joint has a second peak centered on a third axis, and a second recess centered on a fourth axis, wherein said first recess is adapted to receive a third peak comparable to said first peak, and said second recess is adapted to receive a fourth peak comparable to said second peak.

35. The precast, landscape edging module of claim 34, wherein said first peak and said second peak are pointed.

36. The precast, landscape edging module of claim 34, wherein said first axis is parallel to said second axis, said third axis is parallel to said fourth axis, and said first axis is aligned with said fourth axis and said second axis is aligned with said third axis.

37. The precast, landscape edging module of claim 34, wherein said first bidirectional, interlocking joint has a first substantially flat surface extending from said first outer surface to said first peak, a second substantially flat surface extending from said second outer surface to said first recess, a third substantially flat surface extending from said first outer surface to said second recess and a fourth substantially flat surface extending from said second outer surface to said second peak.

38. The precast, landscape edging module of claim 37, wherein said first substantially flat surface is substantially perpendicular to said first outer surface, said second substantially flat surface is substantially perpendicular to said second outer surface, said third substantially flat surface is substantially perpendicular to said first outer surface, said fourth substantially flat surface is substantially perpendicular to said second outer surface.

39. The precast, landscape edging module of claim 37, wherein said first substantially flat surface is substantially parallel to said third substantially flat surface and to said fourth substantially flat surface and said second substantially flat surface is substantially parallel to said third substantially flat surface and to said fourth substantially flat surface.

40. The precast, landscape edging module of claim 33, wherein said first outer surface and said second outer surface are substantially planar, said first outer surface and said second outer surface are substantially parallel to one another.

41. The precast, landscape edging module of claim 33, further comprising a first protrusion positioned between said first outer surface and a second outer surface.

42. A landscape edge unit, comprising:
(a) a body having a first outer surface and a second outer surface; and (b) a first end extending from said first outer surface to said second outer surface and a second end extending from said first outer surface to said second outer surface, said first end having a first end surface and said second end having a second end surface, said first end surface and said second end surface identical in shape, adapted to prevent slippage, and to interlock with one another, wherein said body is divided into a first picket region, a second picket region, and a joining region, said first picket region connected to and positioned between said first outer surface and said second outer surface and having at least one first protrusion extending therefrom, said second picker region connected to and positioned between said first outer surface and said second outer surface and having at least one second protrusion extending therefrom, said joining region joining and positioned between said first picket region and said second picket region and between said first outer surface and said second outer surface and further wherein said joining region has a joining surface length and further wherein said first end surface is joined to said first picket region such that said first end surface is positioned at a location from said first picket region that is substantially equal to one half of said joining surface length and said second end surface is joined to said second picket region such that said second end surface is positioned at a location from said second picket region that is substantially equal to one half of said joining surface length.

43. A landscape edging unit, comprising:

(a) a body having a first outer surface and a second outer surface; and (b) a first end having a first end surface extending from said first outer surface to said second outer surface, said first end surface adapted to flexibly interlock with a second landscape edging unit having a second end having a second end surface extending from a third outer surface to a fourth outer surface of said second landscape edging unit, wherein said first end surface has a first end peak and a first end recess and said second end surface has a second end peak and a second end recess, said first end peak designed to fit into said second end recess and said second end peak designed to fit into said first end recess and further wherein said first end surface and said second end surface when positioned to interlock with one another form at least one gap between said first end surface and said second end surface to enable said first end and said second end to move and yet remain interlocked with one another.

44. The landscape edging unit of claim 43, further wherein said first outer surface and said second outer surface are substantially similar to one another in appearance.

45. The landscape edging unit of claim 43, further wherein said at least one gap exists between said first outer surface of said landscape edging unit and said third outer surface of said second landscape edging unit.

46. The landscape edging unit of claim 45, further wherein said at least one gap also exists between said second outer surface of said landscape edging unit and said fourth outer surface of said second landscape edging unit.

47. The landscape edging unit of claim 43, wherein said first end peak and said second end peak are pointed.

48. The landscape edging unit of claim 43, wherein said landscape edging unit is comprise of precast concrete.

49. A precast, landscape edging module, comprising:

(a) a block body having a first outer surface and a second outer surface and a first end surface extending from said first outer surface to said second outer surface and a second end extending from said first outer surface to said second outer surface, and (b) a first bidirectional, interlocking first joint disposed on said first end surface and a second bidirectional, interlocking joint disposed on said second end surface, wherein said first bidirectional, interlocking joint adapted to interlock with said second bidirectional, interlocking joint means to prevent slippage and to enable rotation of said block body, wherein said first bidirectional, interlocking joint has a first peak centered on a first axis and a first recess centered on a second axis and said second bidirectional, interlocking joint has a second peak centered on a third axis, and a second recess centered on a fourth axis, wherein said first recess is adapted to receive a third peak comparable to said first peak such said first recess is adapted to receive a fourth peak comparable to said second peak, further wherein said first bidirectional, interlocking joint has a first substantially flat surface extending from said first outer surface to said first peak, a second substantially that surface extending from said second outer surface and said first recess, a third substantially flat surface extending from said first outer surface to said second recess and a fourth substantially flat surface extending from said second outer surface to said second peak.

50. The precast, landscape edging module of claim 49, wherein said first substantially flat surface is substantially perpendicular to said first outer surface, said second substantially flat surface is substantially perpendicular to said second outer surface, said third substantially flat surface is substantially perpendicular to said first outer surface, and said fourth substantially flat surface is substantially perpendicular to said second outer surface.

51. The precast, landscape edging module of claim 49, wherein said first substantially flat surface is substantially parallel to said third substantially flat surface and to said fourth substantially flat surface and said second substantially flat surface is substantially parallel to said third substantially flat surface and to said fourth substantially flat surface.

52. A landscape edging unit, comprising:

(a) a body having a first outer surface and a second outer surface; and (b) a first end extending from said first outer surface to said second outer surface and a second end extending from said first outer surface to said second outer surface, said first end having a first end surface and said second end having a second end surface, said first end surface and said second end surface adapted to prevent slippage and to interlock one another, wherein said first end surface is comprised of a first geometric section, a second geometric section, a third geometric section, and a fourth geometric section, said first geometric section connected to said first outer surface of said body and to said second geometric surface, said second geometric section connected to said first geometric section and to said third geometric section, said third geometric section connected to said second geometric section and to said fourth geometric section and said fourth geometric section connected to said third geometric section and to said second outer surface of said body, said first geometric section substantially perpendicular to said first outer surface of said body, said fourth geometric section substantially perpendicular to said second outer surface of said body, and further wherein said second geometric section intersects said first geometric section at a first angle and said third geometric section intersects said fourth geometric section at a second angle, and yet further wherein said first angle and said second angle are equal to 55 degrees.

53. A landscape edging unit, comprising:
(a) a body having a first outer surface and a second outer surface; and
(b) a first end extending from said first outer surface to said second outer surface and a second end extending from said first outer surface to said second outer surface, said first end having a first end surface and said second end having a second end surface, said first end surface and said second end surface adapted to prevent slippage and to interlock one another,
   wherein said first end surface is comprised of a first geometric section, a second geometric section, a third geometric section, and a fourth geometric section,
   said first geometric section connected to said first outer surface of said body and to said second geometric surface,
   said second geometric section connected to said first geometric section and to said third geometric section,
   said third geometric section connected to said second geometric section and to said fourth geometric section and
   said forth geometric section connected to said third geometric section and to said second outer surface of said body,
   said first geometric section substantially perpendicular to said first outer surface of said body,
   said fourth geometric section substantially perpendicular to said second outer surface of said body,
   and further wherein said second geometric section intersects said first geometric section at a first angle and said third geometric section intersects said fourth geometric section at a second angle,
   and yet further wherein said first angle and said second angle are equal to one another and less than 180 degrees.

54. A landscape edging unit, comprising;
(a) a body having a first outer surface and a second outer surface; and
(b) a first end extending from said first outer surface to said second outer surface and a second end extending from said first outer surface to said second outer surface,
   said first end having a first end surface and said second end having a second end surface,
   said first end surface and said second end surface adapted to prevent slippage and to interlock one another,
      wherein said first end surface is comprised of a first geometric section, a second geometric section, a third geometric section, and a fourth geometric section,
      said first geometric section connected to said first outer surface of said body and to said second geometric surface,
      said second geometric section connected to said first geometric section and to said third geometric section,
      said third geometric section connected to said second geometric section and to said fourth geometric section and
      said fourth geometric section connected to said third geometric section and to said second outer surface of said body,
      said first geometric section substantially perpendicular to said first outer surface of said body, said fourth geometric section substantially perpendicular to said second outer surface of said body,
      and further wherein said second geometric section intersects said first geometric section at a first angle and said third geometric section intersects said fourth geometric section at a second angle,
      and yet wherein said second geometric region and said third geometric region intersect together at a right angle.

55. A precast landscape edging unit, comprising:
a body having a first end surface, a first outer surface and a second outer surface,
wherein said first end surface extends between said first outer surface and said second outer surface,
further wherein said first end surface designed to flexibly interlock with a second end surface of a second body around a first pivot point and a second pivot point, said second end surface extending between a third outer surface and a fourth outer surface, said second end surface complementary to said first end surface, in which said first and second pivot points are comprised of a combination of a sawtooth and a corresponding recess designed to conform to said sawtooth,
said first end surface also adapted to interlock with another second end surface of said second body in such a manner that a gap exists between said first end surface and said second end surface of said second body to permit said body and said second body to partially rotate around a connection formed between said first end surface and said second end surface, while still interlocked.

56. The precast landscape edging unit of claim 55, wherein said precast landscape edging unit is comprised of concrete.

57. The precast landscape edging unit of claim 55, wherein said sawtooth is pointed.

58. The precast landscape edging unit of claim 55, wherein said gap is positioned between a first intersection of said first end surface and said first outer surface and a second intersection between said second end surface and said third outer surface.

59. The precast landscape edging unit of claim 58, wherein a second gap is positioned between a third intersection of said first end surface and said second outer surface and a fourth intersection between said second end surface and said fourth outer surface.

60. The precast landscape edging unit of claim 55, wherein said gap is of uniform size.

61. A landscape edging unit, comprising:
(a) a body having a first outer surface and a second outer surface; and
(b) a first end having a first end surface extending from said first outer surface to said a second outer surface and
a second end having a second end surface extending from said first outer surface to said second outer surface,
said first end surface and said second end surface having complimentary configurations, said first end surface and said second end surface adapted to interlock with one another and to permit partial rotation of said body around said first end or said second end, even when said body is interlocked with a second body, said first end surface and said second end surface reversible, identical and interchangeable with one another.

62. The landscape edging unit of claim 61, wherein said first end surface is comprised of a first sawtooth and a first end recess positioned adjacent to and joining said first sawtooth designed to receive a second sawtooth, said first sawtooth and said second sawtooth comparable shape and size and further wherein said second end surface is comprised of said second sawtooth and a second end recess positioned adjacent to and joining said second sawtooth designed to receive said first sawtooth, said fist end recess and said second end recess comparable in shape and size.

63. The landscape edging unit of claim 62, wherein said first sawtooth and said second sawtooth are pointed.

64. The landscape edging unit of claim 63, wherein said landscape edging unit is comprised of precast concrete.

65. The landscape edging unit of claim 63, wherein said landscape edging unit is comprised of crushed stone, sand, water, and pigment.

66. A precast landscape edging unit, comprising:
(a) a body having a first outer surface and a second outer surface; and
(b) a first end extending from said first outer surface to said second outer surface; and
(c) a first joint disposed on said first end surface
wherein said first joint is adapted to prevent slippage and to interlock with a second joint disposed in a second end surface of a second body of a second precast landscape edging unit to create a common joint, said first joint when interlocked with said second joint of said second end surface of said second body of said second precast landscape edging unit permits rotation of said body and said second body around said common joint,
wherein said first joint is comprised with a first sawtooth and a first end recess positioned adjacent to and joining said first sawtooth designed to receive a second sawtooth, said first sawtooth and said second sawtooth having comparable shapes and sizes and further wherein said second joint is comprised with said second sawtooth and a second end recess positioned adjacent to and joining said second sawtooth designed to receive said first sawtooth, said first end recess and said second end recess having comparable shapes and sizes.

67. The landscape edging unit of claim 66, wherein said first sawtooth and said second sawtooth are pointed.

68. A precast, landscape edging module, comprising:
(a) a block body having a first outer surface and a second outer surface and a first end surface extending from said first outer surface to said second outer surface and a second end surface extending from said first outer surface to said second outer surface, and
(b) a first bidirectional, interlocking joint disposed on said first end surface and a second bidirectional, interlocking joint disposed on said second end surface, wherein said first bidirectional, interlocking joint is adapted to interlock with said second bidirectional, interlocking joint to prevent slippage and to enable partial rotation of said block body around said first bidirectional, interlocking first joint or around said second bidirectional, interlocking joint, said first bidirectional, interlocking first joint having complementary configurations, said first bidirectional, interlocking joint and said second bidirectional, interlocking joint reversible, identical and interchangeable with one another.

69. The precast, landscape edging module of claim 68, wherein said first bidirectional, interlocking joint is comprised of a first sawtooth and a first end recess positioned adjacent to and joining said first sawtooth designed to receive a second sawtooth, said first sawtooth and said second sawtooth having comparable shapes and dimensions and further wherein said second bidirectional, interlocking joint is comprised of said second sawtooth and a second end recess positioned adjacent to and joining said second sawtooth designed to receive said first sawtooth, said first end recess and said second end recess having comparable shapes and dimensions.

70. The precast, landscape edging module of claim 69, wherein said first sawtooth and said second sawtooth are pointed.

71. The precast, landscape edging module of claim 70, wherein said module is comprised of precast concrete.

72. The precast, landscape edging module of claim 70, wherein said module is comprised of crushed stone, sand, water, and pigment.

73. A landscape edging unit, comprising:
(a) a body having a first outer surface and a second outer surface; and
(b) a first end having a first end surface extending from said first outer surface to said second outer surface and adapted to prevent slippage and to interlock with a second landscape edging unit similar to said landscape edging unit in that said second landscape edging unit has a second body having a second end having a second end surface extending from a third outer surface of said second body to a fourth outer surface of said second body,
first end surface when positioned to interlock with said second end surface forms a first gap between said first end surface and said second end surface at a first intersection between said first end surface and said first outer surface of said body and at a third intersection between said second end surface and said third outer surface of said second body and a second gap between said first end surface and said second end surface at a second intersection between said first end surface and said second outer surface of said body and at a fourth intersection between said second end surface and said fourth outer surface of said second body,
wherein said first end surface has a first end peak and a first end recess and said second end surface has a second end peak and a second end recess, said first end peak designed to fit into said second end recess and said second end peak designed to fit into said first end recess.

74. The landscape edging unit of claim 73, wherein said body is curved.

75. The landscape edging unit of claim 73, wherein said first outer surface and said second outer surface are substantially parallel to one another.

76. The landscape edging unit of claim 73, wherein said body is comprised of crushed stone, sand, water, and pigment.

77. The landscape edging unit of claim 73, wherein said body is comprised of precast concrete.

78. The landscape edging unit of claim 73, wherein said body has at least one pointed protrusion extending from said body.

79. The landscape edging unit of claim 73, wherein said body is divided into a first picket region, a second picket region, and a joining region, said first picket region connected to and positioned between said first outer surface and said second outer surface and having at least one first protrusion extending therefrom, said second picket region connected to and positioned between said first outer surface and said second outer surface and having at least one second protrusion extending therefrom, said joining region joining and positioned between said first picket region and said second picket region and between said first outer surface and said second outer surface.

80. The landscape edging unit of claim 79, wherein a first portion of said first picket region upon which said first protrusion is based, a second portion of said second picket region upon which said second protrusion is based, and said joining section are comparable in size.

81. The landscape edging unit of claim 73, wherein said first end peak and said second end peak are pointed.

82. A landscape edging unit, comprising:
 (a) a body having a first outer surface and a second outer surface; and
 (b) a first end having a first end surface extending from said first outer surface to said second outer surface and adapted to prevent slippage and to interlock with a second landscape edging unit similar to said landscape edging unit in that said second landscape edging unit has a second body having a second end having a second end surface extending from a third outer surface of said second body to a fourth outer surface of said second body,
  said first end surface when positioned to interlock with said second end surface forms a first gap between said first end surface and said second end surface at a fist intersection between said first end surface and said first outer surface of said body and at a third intersection between said second end surface and said third outer surface of said second body and
  a second gap between said first end surface and said second end surface at a second intersection between said first end surface and said second outer surface of said body and at a fourth intersection between said second end surface and said fourth outer surface of said second body,
 wherein said first end surface is comprised of a first geometric section, a second geometric section, a third geometric section, and a fourth geometric section,
  said first geometric section connected to said first outer surface of said body and to said second geometric surface,
  said second geometric section connected to said fist geometric section and to said third geometric section,
  said third geometric section connected to said second geometric section and to said fourth geometric section and
  said fourth geometric section connected to said third geometric section and to said second outer surface of said body,
  said first geometric section substantially perpendicular to said first outer surface of said body,
  said fourth geometric section substantially perpendicular to said second outer surface of said body.

83. The landscape edging unit of claim 82, wherein said second geometric section and said third geometric section are complementary to one another.

84. The landscape edging unit of claim 82, wherein said second geometric section intersects said first geometric section at a first angle and said third geometric section intersects said fourth geometric section at a second angle.

85. The landscape unit of claim 84, wherein said first angle and said second angle are equal to 45 degrees.

86. The landscape unit of claim 84, wherein said first angle and said second angle are equal to one another.

87. The landscape unit of claim 82, wherein said second geometric region and said third geometric region intersect one another at a right angle.

88. The landscape edging unit of claim 82, wherein said body is curved.

89. The landscape edging unit of claim 82, wherein said first outer surface and said second outer surface are substantially parallel to one another.

90. The landscape edging unit of claim 82, wherein said body is comprised of crushed stone, sand, water, and pigment.

91. The landscape edging unit of claim 82, wherein said body has at least one pointed protrusion extending from said body.

92. The landscape edging unit of claim 82, wherein said body is divided into a first picket region, a second picket region, and a joining region, said first picket region connected to and positioned between said first outer surface and said second outer surface and having at least one first protrusion extending therefrom, said second picket region connected to and positioned between said first outer surface and said second outer surface and having at least one second protrusion extending therefrom, said joining region joining and positioned between said first picket region and said second picket region and between said first outer surface and said second outer surface.

93. The landscape edging unit of claim 92, wherein a first portion of said first picket region upon which said first protrusion is based, a second portion of said second picket region upon which said second protrusion is based, and said joining section are comparable in size.

94. A landscape edging unit, comprising:
 (a) a body having a first outer surface and a second outer surface; and
 (b) a first end having a first end surface extending from said first outer surface to said second outer surface and adapted to prevent slippage and to interlock with a second landscape edging unit similar to said landscape edging unit in that said second landscape edging unit has a second body having a second end having a second end surface extending from a third outer surface of said second body to a fourth outer surface of said second body,
  said first end surface when positioned to interlock with said second end surface forms a first gap between said first end surface and said second end surface at a first intersection between said first end surface and said first outer surface of said body and at a third intersection between said second end surface and said third outer surface of said second body and a second gap between said first end surface and said second end surface at a second intersection between said first end surface and said second outer surface of said body and at a fourth intersection between said second end surface and said fourth outer surface of said second body,
  wherein said first end surface has a first sawtooth and a first end recess positioned adjacent to and joining said first sawtooth and said second end surface has a second sawtooth and a second end recess positioned adjacent to and joining said second sawtooth, said first end recess designed to receive said second sawtooth, said second end recess designed to receive said first sawtooth, said first sawtooth and said second sawtooth having comparable shapes and dimensions.

95. A precast, landscape edging unit, comprising:

(a) a body having a first outer surface and a second outer surface; and (b) a first end extending from said first outer surface to said second outer surface; and (c) a first joint means disposed on said first end surface wherein said first joint means is adapted to prevent slippage and to interlock with a second joint means disposed in a second end surface of a second body of a second precast landscape edging unit to create a joint, said first joint means when interlocked with said second joint means of said second end surface of said second body of said second precast landscape edging unit permits rotation of said body and said second body around said joint, wherein said first joint means is comprised with a first sawtooth and a first end recess positioned adjacent to and joining said first sawtooth designed to receive a second sawtooth, said first sawtooth and said second sawtooth having comparable shapes and dimensions and further wherein said second joint means is comprised with said second sawtooth and a second end recess positioned adjacent to and joining said second sawtooth designed to receive said first sawtooth, said first end recess and said second end recess comparable in shape and size.

96. The precast, landscape edging unit of claim 95, wherein said first sawtooth and second sawtooth are pointed.

97. A precast, landscape edging module, comprising:

(a) a block body having a first outer surface and a second outer surface and a first end surface extending from said first outer surface to said second outer surface and a second end surface extending from said first outer surface to said second outer surface, and (b) a first bidirectional, interlocking first joint disposed on said first end surface and a second bidirectional, interlocking joint disposed on said second end surface, wherein said first bidirectional, interlocking joint adapted to interlock with said second bidirectional, interlocking joint to prevent slippage and to enable partial rotation of said block body around said first bidirectional, interlocking first joint or around said second bidirectional, interlocking joint, wherein said first bidirectional, interlocking joint has a first peak centered on a first axis and a first recess centered on a second axis and said second bidirectional, interlocking joint has a second peak centered on a third axis, and a second recess centered on a fourth axis, wherein said first recess is adapted to receive a third peak comparable to said first peak, and said second recess is adapted to receive a fourth peak comparable to said second peak.

98. The precast, landscape edging module of claim 97, wherein said first axis is parallel to said second axis, said third axis is parallel to said fourth axis, and said first axis is aligned with said fourth axis and said second axis is aligned with said third axis.

99. The precast, landscape edging module of claim 97, wherein said first bidirectional, interlocking joint has a first substantially flat surface extending from said fist outer surface to said first peak, a second substantially flat surface extending from said second outer surface to said first recess, a third substantially flat surface extending from said first outer surface to said second recess and a fourth substantially flat surface extending from said second outer surface TO said second peak.

100. The precast, landscape edging module of claim 99, wherein said first substantially flat surface is substantially perpendicular to said first outer surface, said second substantially flat surface is substantially perpendicular to said second outer surface, said third substantially flat surface is substantially perpendicular to said first outer surface, said fourth substantially flat surface is substantially perpendicular to said second outer surface.

101. The precast, landscape edging module of claim 99, wherein said first substantially flat surface is substantially parallel to said third substantially flat surface and to said fourth substantially flat surface and said second substantially flat surface is substantially parallel to said third substantially flat surface and to said fourth substantially flat surface.

102. The precast, landscape edging module of claim 97, wherein said first outer surface and second outer surface are substantially planar, said first outer surface and said second outer surface are substantially parallel to one another.

103. The precast, landscape edging module of claim 92, further comprising a first protrusion positioned between said first outer surface and a second outer surface.

104. The precast, landscape edging module of claim 97, wherein said first peak and said second peak are pointed.

* * * * *